(12) United States Patent
Kaiser et al.

(10) Patent No.: US 10,750,906 B2
(45) Date of Patent: Aug. 25, 2020

(54) BRAZIER

(71) Applicants: Thomas Kaiser, Schrattenbach (DE); Christian Wassermann, Kraftisried (DE)

(72) Inventors: Thomas Kaiser, Schrattenbach (DE); Christian Wassermann, Kraftisried (DE)

( * ) Notice: Subject to any disclaimer, the term of this patent is extended or adjusted under 35 U.S.C. 154(b) by 238 days.

(21) Appl. No.: 15/751,985

(22) PCT Filed: Aug. 10, 2016

(86) PCT No.: PCT/EP2016/001371
§ 371 (c)(1),
(2) Date: Jun. 22, 2018

(87) PCT Pub. No.: WO2017/025192
PCT Pub. Date: Feb. 16, 2017

(65) Prior Publication Data
US 2018/0279828 A1 Oct. 4, 2018

(30) Foreign Application Priority Data
Aug. 10, 2015 (DE) .................... 20 2015 005 487 U

(51) Int. Cl.
| | |
|---|---|
| *A47J 37/07* | (2006.01) |
| *F24B 3/00* | (2006.01) |
| *F23Q 25/00* | (2006.01) |
| *F24B 1/181* | (2006.01) |
| *F23D 3/16* | (2006.01) |
| *F21V 35/00* | (2006.01) |

(52) U.S. Cl.
CPC ........... *A47J 37/0718* (2013.01); *A47J 37/07* (2013.01); *F23Q 25/00* (2013.01); *F24B 1/181* (2013.01); *F24B 3/00* (2013.01); *F21V 35/00* (2013.01); *F23D 3/16* (2013.01)

(58) Field of Classification Search
CPC .................................. F23D 3/16; F23Q 25/00
See application file for complete search history.

(56) References Cited

U.S. PATENT DOCUMENTS

| | | | |
|---|---|---|---|
| 2,920,614 A | 1/1960 | Phelps | |
| 3,167,040 A | 1/1965 | Byars, Sr. et al. | |
| 3,318,300 A * | 5/1967 | Witty | ............... A47J 37/0786 126/25 C |

(Continued)

OTHER PUBLICATIONS

Translation of Written Opinion of the International Searching Authority in corresponding PCT Application No. PCT/EP2016/001371 dated Nov. 7, 2016.

*Primary Examiner* — David J Laux
(74) *Attorney, Agent, or Firm* — Myers Andras, LLP; Joseph C. Andras

(57) ABSTRACT

In order to improve the safety and handling of a brazier (1) for burning wood and similar fuels, comprising a substantially pot-shaped basket (2) and a fire pan (4), it is suggested that the fire pan (4) is mounted on the basket (2) such that these can pivot relative to one another, particularly tipping by 180° or "overend" from the operating position into a fire-extinguishing position, the basket (2) that lies above when in said extinguishing position serving as the cover hood that puts out the fire. This brazier can also be in the form of a tea light, a standard or table lamp or a pendant lamp.

20 Claims, 5 Drawing Sheets

(56) References Cited

U.S. PATENT DOCUMENTS

| | | | | |
|---|---|---|---|---|
| 3,617,022 | A | * 11/1971 | Wiggins | A47J 37/07 248/398 |
| 4,390,002 | A | * 6/1983 | Daily, III | A47J 37/0786 126/25 R |
| 4,542,733 | A | * 9/1985 | Chan | A47J 37/0713 126/25 R |
| 9,603,484 | B2 | * 3/2017 | Cleveland | A47J 37/04 |
| 2010/0258106 | A1 | * 10/2010 | Simms, II | A47J 37/0704 126/25 R |
| 2012/0174798 | A1 | * 7/2012 | Kulikowski | A47J 36/18 99/340 |
| 2014/0021314 | A1 | * 1/2014 | Bourlier | A47J 37/0786 248/225.11 |
| 2014/0261010 | A1 | 9/2014 | Kolb | |

* cited by examiner

BRAZIER

BACKGROUND OF THE INVENTION

1. Field of the Invention

The invention relates to a brazier for burning wood and similar fuels, with the preamble features of claim 1.

2. Description of the Related Art

Such braziers are used outdoors (garden, terrace, etc.) in the manner of mobile fires. Thus, DE 202 10 747 U1 discloses a "pot-shaped" brazier with a grill having a slotted jacket, so that sufficient air reaches the fuel. The problem, however, is that embers can fall out of the brazier, so that refractory substrates (stone slabs, gravel, etc.) are required to avoid fire damages. This also applies to extinguishing of the fire, e.g. after the end of a garden party, when the brazier is usually without supervision and even without added fuel, the fire can flare up again, especially in wind. In addition, the disposal of the fire, f. i. the next day, is quite cumbersome because the bottom of the brazier is relatively low and thus difficult to clean. This also applies to a charcoal lighter according to U.S. Pat. No. 3,167,040 or a furnace according to U.S. Pat. No. 3,318,300, wherein the fire is extinguished by sand, which is then difficult to dispose of.

Thus, such a brazier should be improved in safety and handling.

This object is solved with the features of claim 1. Advantageous embodiments are the subject of dependent claims.

SUMMARY OF THE INVENTION

The proposed brazier can be manufactured in a relatively inexpensive and stable manner, in particular made of sheet steel and can be used as a outdoor grill, as well. In this case, company logos etc. can be stamped or cut into the outer wall of the housing-like basket. Due to the pivotal mounting of the pan-shaped fire pan, the ground is protected from fire damages. In addition, due to the downwardly closed shape of the bowl-shaped fire pan, the fire material cannot fall out of the brazier. Thus, users are also protected from burn injuries. The pivotally mounted fire pan provides a safe cooling-down of the fire after operation of the brazier, since remaining embers are safely encased by the "top over" of the basket by 180° or "overhead" tilting at the periphery, so that flying sparks or a flare-up can be ruled out.

Surprisingly, it was found that the basket on top of the tilting bowl virtually completely encases the fire pan and smothers the smouldering fuel. Even if the sealing is not 100% at the edges, the resulting carbon monoxide sinks down and thus blocks air supply to the fire pan and the fuel in it. As table lamps or so-called tea lights have a similar structure, the invention is also applicable to such lamps or lights, as they form smaller-sized fire pans, even if they are usually operated with oil or wax instead of wood-like fuels.

Due to the openings provided on the basket periphery the pleasant impression of an open fire is created during operation of the brazier. After the tilting of the basket, preferably in cube-like shape, such openings support the cooling-down of the fire pan and the remains of fire therein. This can be done relatively quickly, since the basket and the fire pan are made of sheet steel, possibly also made of stainless steel or aluminium in a conical form, thus providing a large heat sink area (after extinction of the fire).

For later cleaning of the brazier, e.g. the following day, the fire pan has preferably two handles, making it easy to remove it out of the basket and clean it separately. Preferably bearings are integrally formed at the fire pan (near the handles), which allow simple lifting of the fire pan and form at the same time a pivotal mounting of the fire pan.

In addition, the brazier or its jacket-shaped basket can be closed with a lid at the upper end, which particularly forms a seat. In the operating position of the brazier the lower end preferably includes two support strips, which are integrally formed at the basket by bending and punching of the basket plate. The bottom of the basket can also be largely closed, so as to form in the extinguishing position an overhead cover at which carbon monoxide accumulates and then sinks down to extinguish the fire without additives. The support strips run parallel to the pivot bearings arranged in the middle height range of the brazier, so that the fire pan remains in a horizontal position (without fuel falling out) on tilting the basket around the edge of one support strip of the brazier.

The two support strips on opposite side walls also create a distance from the ground at the lower part of the brazier, so that combustion air is supplied from this partially open bottom of the brazier to a circumferential gap between the inside of the basket and the outer periphery of the fire pan including stacked fuel. In addition, this increases the distance to the ground, so that e.g. a wooden terrace is not overheated. Thus, safe firing is achieved, which can also be used for barbecue purposes, as a grill pad can be placed on the basket, especially in rust form, or a stone slab. In order to control the distance to the embers in the fire pan, a grill support for height adjustment can be inserted in height-offset openings.

Such "bent" support strips allow stacking of plural braziers one above the other, as the support strips provide a positive engagement, so that relatively high, but stable columns can be erected in this way, f. i. to increase the illumination effect by burning fires at several levels. At larger evening events, this results in special lighting effects by the "open" fires on several levels, as well as a pleasant heat development, e.g. at 0.7 and 1.4 meters height from the ground, especially at cooler outdoor temperatures. In addition, the braziers can be stored in a space-saving manner.

DESCRIPTION OF THE DRAWINGS

Further advantages of the invention will become apparent from the following description of embodiments with reference to the drawings. They show in.

DETAILED DESCRIPTION OF THE PREFERRED EMBODIMENTS

Figure 1:
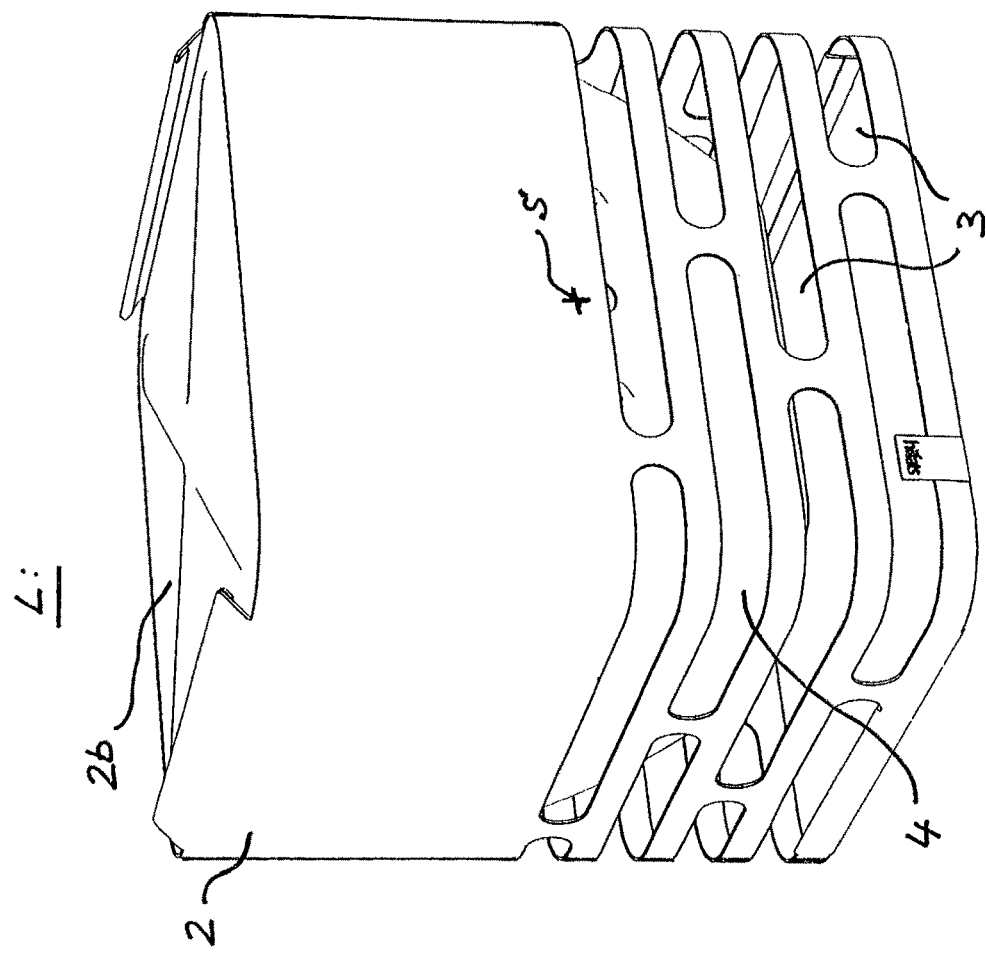
FIG. 1 a perspective view of a brazier in two positions.
Figure 1:
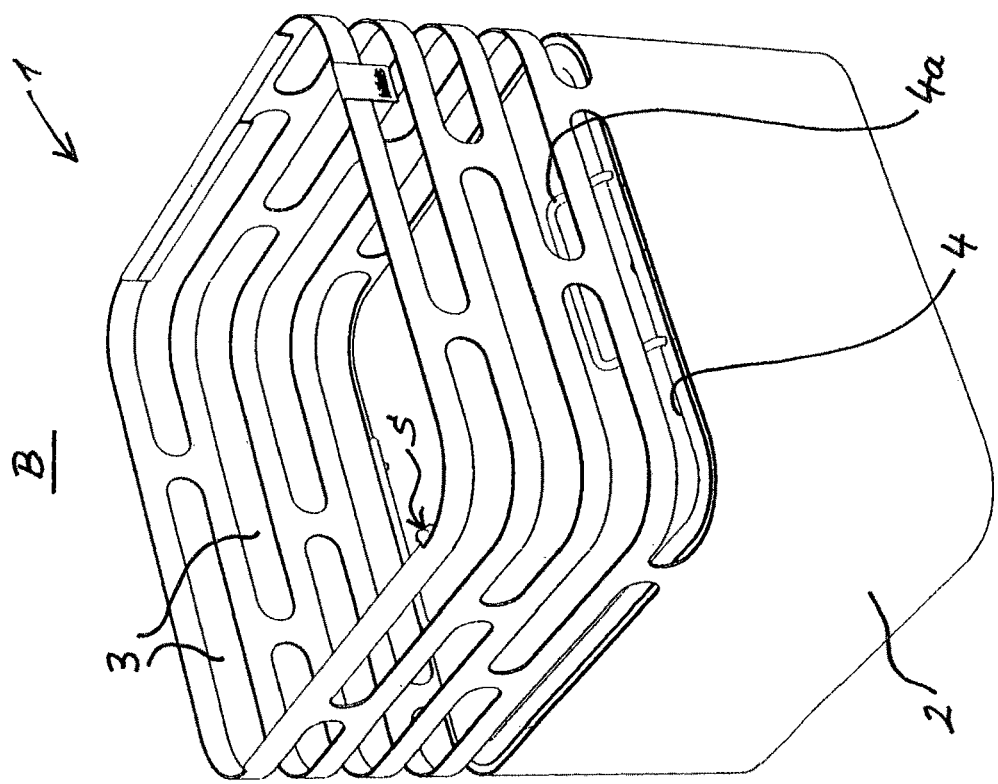

FIG. 1 shows a brazier 1 for burning wood or combustion of similar fuels (such as charcoal) and consists of a parallelepiped basket 2, surrounding a fire pan 4. The basket 2 is preferably made of metal, such as steel sheet, and has in its upper area a plurality of (punched out) openings 3, so that a burning fire in the fire pan 4 is well visible and illuminate and/or heats the environment. The slot-like openings 3 also serve that children cannot reach the open flame and partly to combustion air supply. However, a large part of the combustion air is sucked in at the bottom of the basket 2, which thus acts in the manner of a chimney, as the lower area of the largely closed basket 2 and the outer periphery of the fire pan 4 (with the fuel stacked therein) provide a circumferential gap for air supply to ensure a uniform combustion. The air supply is preferably increased by two support strips 2a on opposite sidewalls of the basket 2 in the lower region of the brazier 1, such that a gap distance to the footprint (ground) is maintained. Thus, safe firing is achieved, which can also be used for barbecue purposes (cf. FIG. 4 with a rust-shaped grill support).

Here, the basket 2 and its wall is formed in a cube shape and preferably consists of a steel sheet, in the upper half of which the apertures or openings 3 are punched or formed by laser or the like. This results in a stable construction of the basket 2, which also serves as an enclosure for the fire pan 4 mounted therein. The fire pan 4 has a slightly smaller base area (cf. the above-mentioned circumferential gap) so as to be able to pivot within the basket 2 in the manner of a swing. This is provided by two pivot bearings S, wherein the pivot axis (see FIG. 3) is aligned in approximately half the height of the basket 2 parallel to the support strips 2a. Thus, the brazier 1 can be tilted from its operating position (B) shown here on the left, in which the fire burns to generate heat and/or light, "overhead" to a fire extinguishing position (L), right here. On this movement, the fire pan 4 (visible here through the slits 3) always remains in a swinging, horizontal position, so that fuel cannot fall out. In the extinguishing position L the fire pan 4 receives little or no supply air, so that the fire suffocates. In this case, the bottom 2b (in position B) forms a top cover in position L, so that the fire pan 4 produces mainly exhaust gases (carbon monoxide) and smother the fire quickly.

Figure 2:
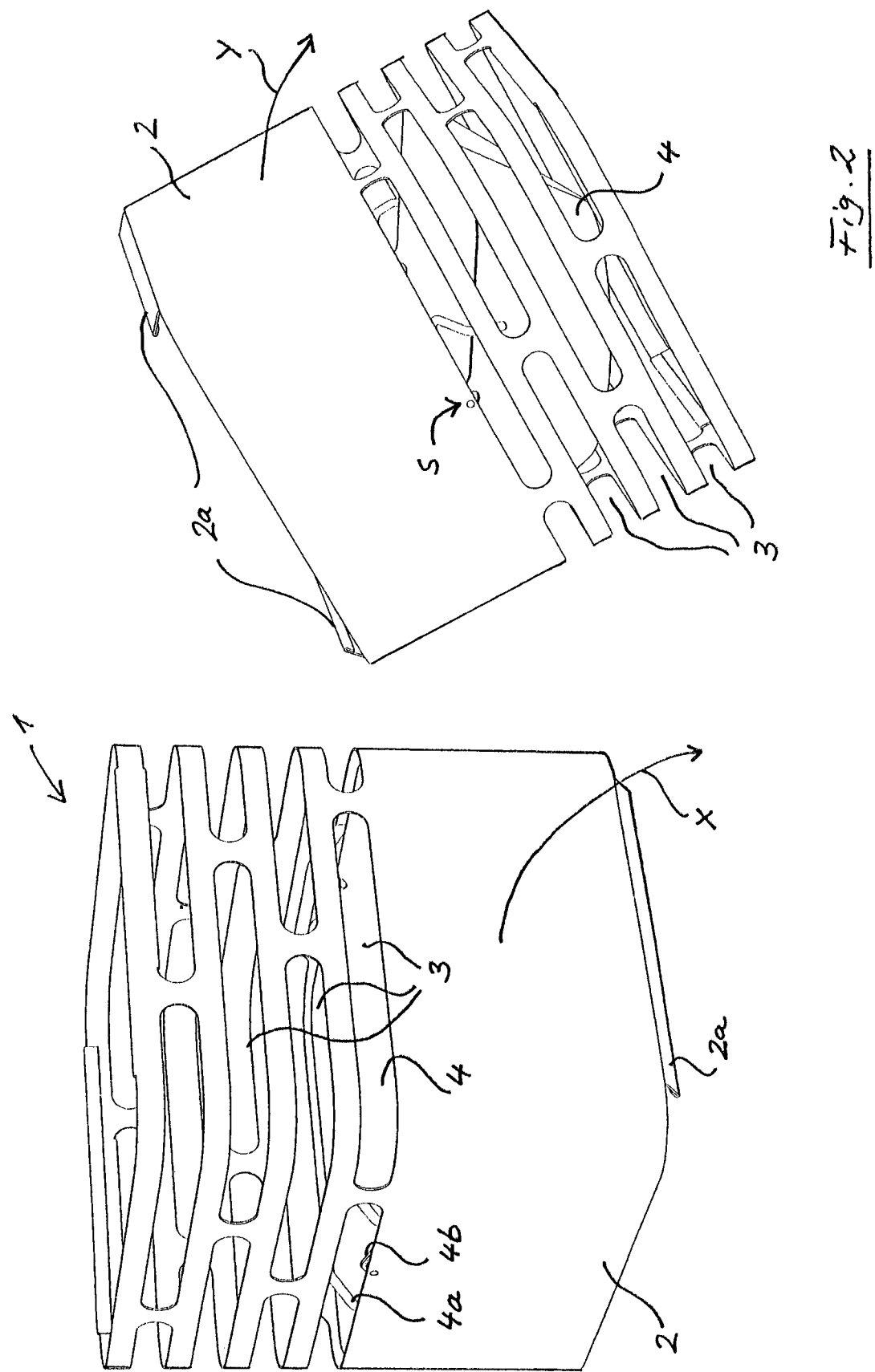
FIG. 2 a perspective view of the brazier of FIG. 1 when transferred from its operating position in a tilted fire extinguishing position, FIG. 3 an interior view of the brazier.

FIG. 2 shows this tilting of the brazier 1, preferably by about 180°. Thus, the basket 2 shown on the left (similar to the position B in FIG. 1) can be gripped at its lower end, preferably on one of the support strips 2a and tilted around the other support strip 2a by 90° (arrow X). Thus, a sidewall of the basket 2 becomes the floor for a short time. Further tilting in the same direction then results in the position shown in FIG. 2 (here with approx. 150° tilt angle with respect to the operating position in FIG. 1) and finally when lowering onto a support reaching the position L (automatic extinguishing position) according to FIG. 1.

FIG. 2 with the intermediate position shows that the fire pan 4 as a swing or cradle always remains in a horizontal orientation, so that fire material or ember is not lost. If the tilting of the brazier 1 with respect to the position in FIG. 2 is continued by a further 30°, as indicated by the arrow Y, the basket 2 then stands on the "open" region provided with the apertures 3 (cf. FIG. 1, right half). As a result, the funnel-shaped fire pan 4 is cooled from below (natural air flow or wind), while the top of the fire pan 4 is covered by the (largely) closed, now overhead area (bottom 2b) of the basket 2. Thus, even in windy conditions, there's no risk of sparks flying from the remaining embers. Rather, the smoke suffocates the fire very quickly in the basket 2, now serving as a "cover". In addition, even rain does not soak the fire pan 4 and the ashes therein, so that cleaning, f. i. the next day, is much easier. For this purpose, handles 4a (cf. FIG. 3, as well) are preferably formed on the fire pan 4 as wire bending parts as well as bearing eyes 4b for pivotally mounting the fire pan 4 about the axis of the pivot bearings S. Gripping at the handles 4a, the fire pan 4 can be easily removed from the basket 2 for emptying the ash.

Figure 3:
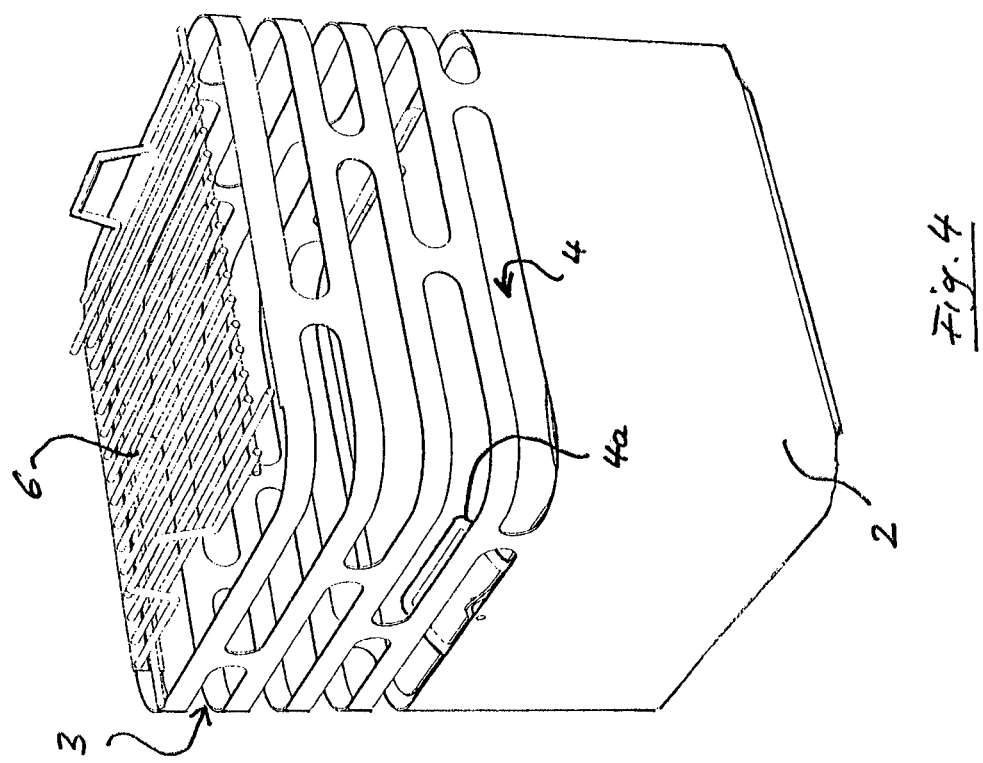
Figure 4:
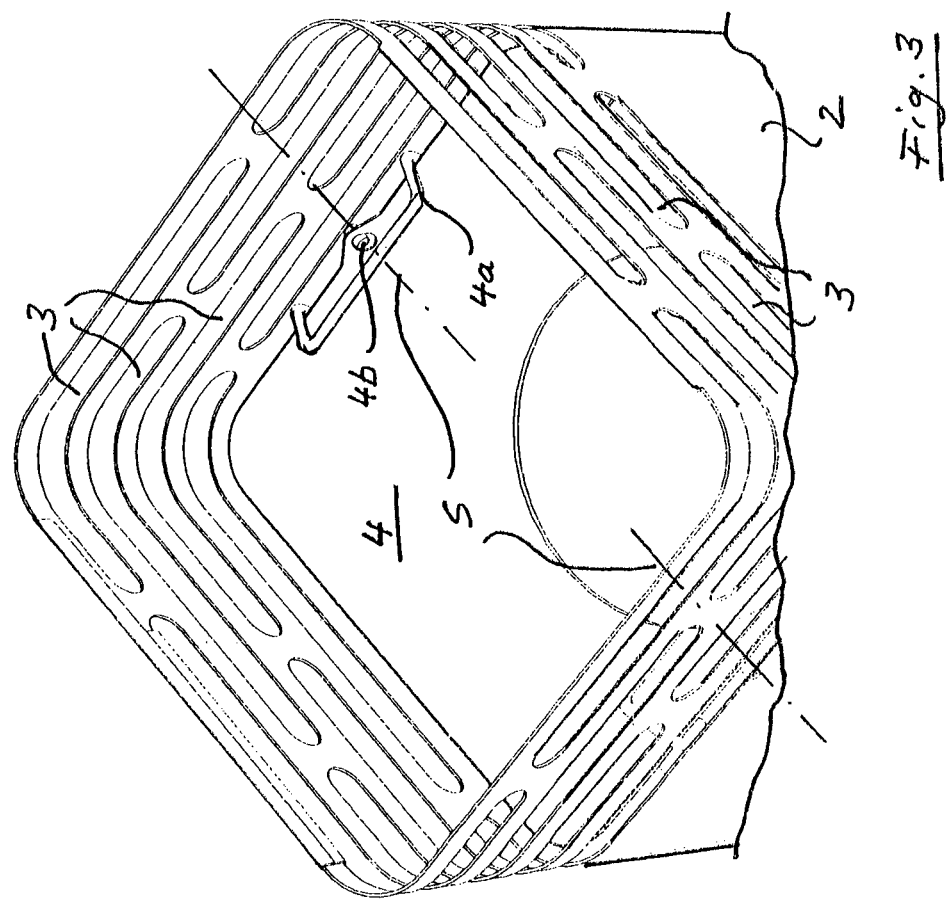
FIG. 4 a perspective view of the brazier with a grill.

FIG. 3 is a view into the interior of the brazier 1 from above, showing one of the handles 4a and a bearing eye 4b of the pivot bearing S. FIG. 4 shows the operating position analogous to FIG. 1, wherein a grill pad 6 is placed on the basket 2, in particular in rust form. The grill pad 6 can be inserted for height adjustment in different openings 3, e.g. inserted in one of the lower rows for higher heat demand.

Figure 5:
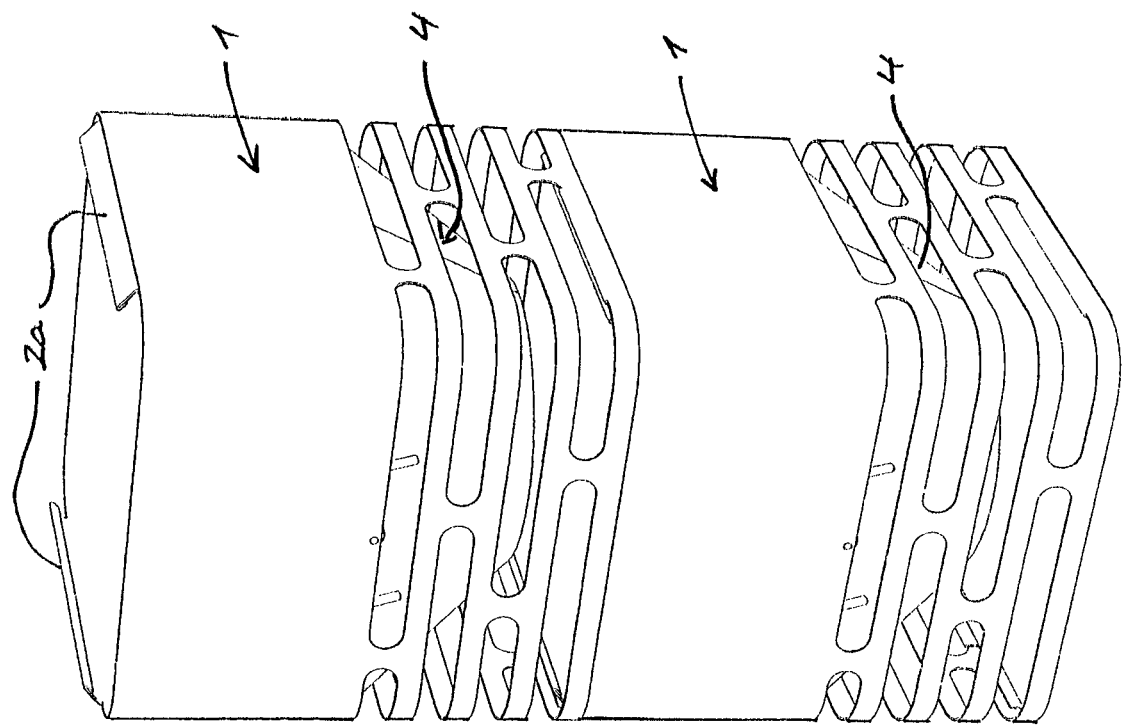
FIG. 5 perspective views with two stacked braziers.
Figure 5:
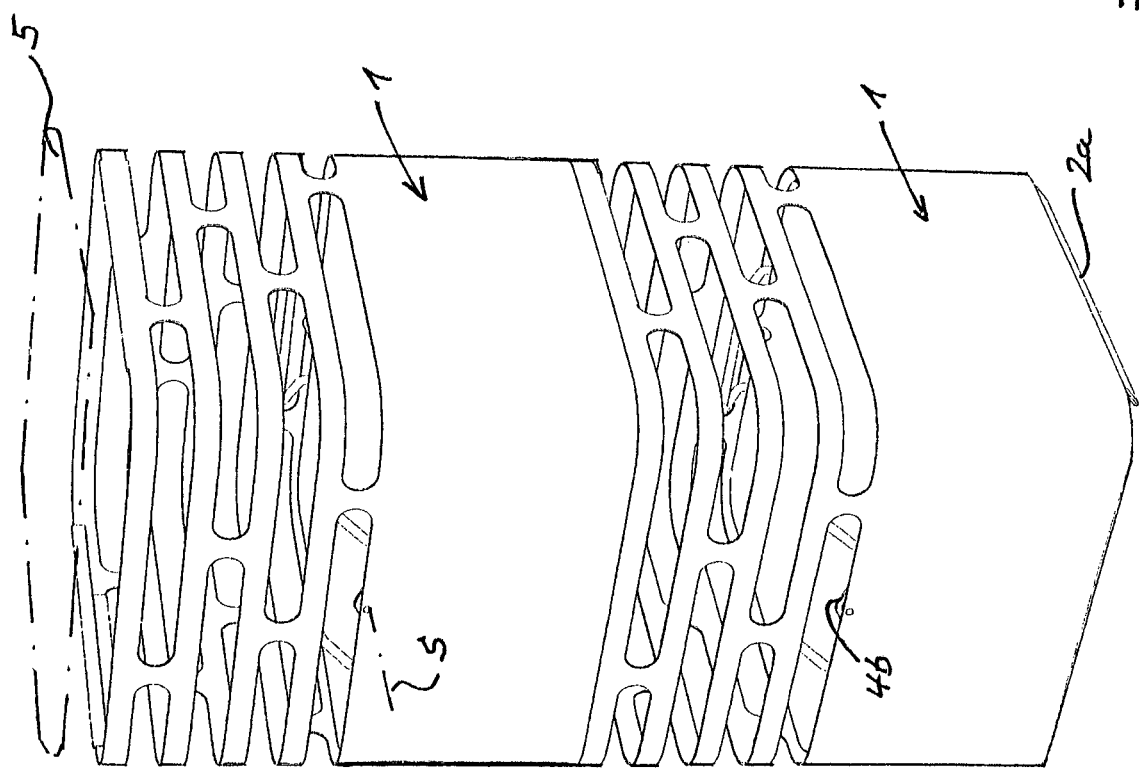

In FIG. 5, two braziers 1 are stacked one above the other, wherein a lid 5 can be placed on the upper basket 2, for forming e.g. an elevated seat or table surface, while in the right half two of the braziers 1, as described above, are stacked in the opposite direction. As mentioned, the baskets 2 are positively positioned by the bended support strips 2a to form a stable column (f. i. also for storage). The above-mentioned lid 5 can also be mounted on the side including the support strips 2a, wherein the lid 5 can be inserted in the manner of a dovetail guide between the support strips 2a. This results in an exact positioning. In the stacking position shown in FIG. 5, the respective fire pans 4 provide increased lighting effects and heat radiation due to the openings 3, as desirable for cool evenings.

Figure 6:
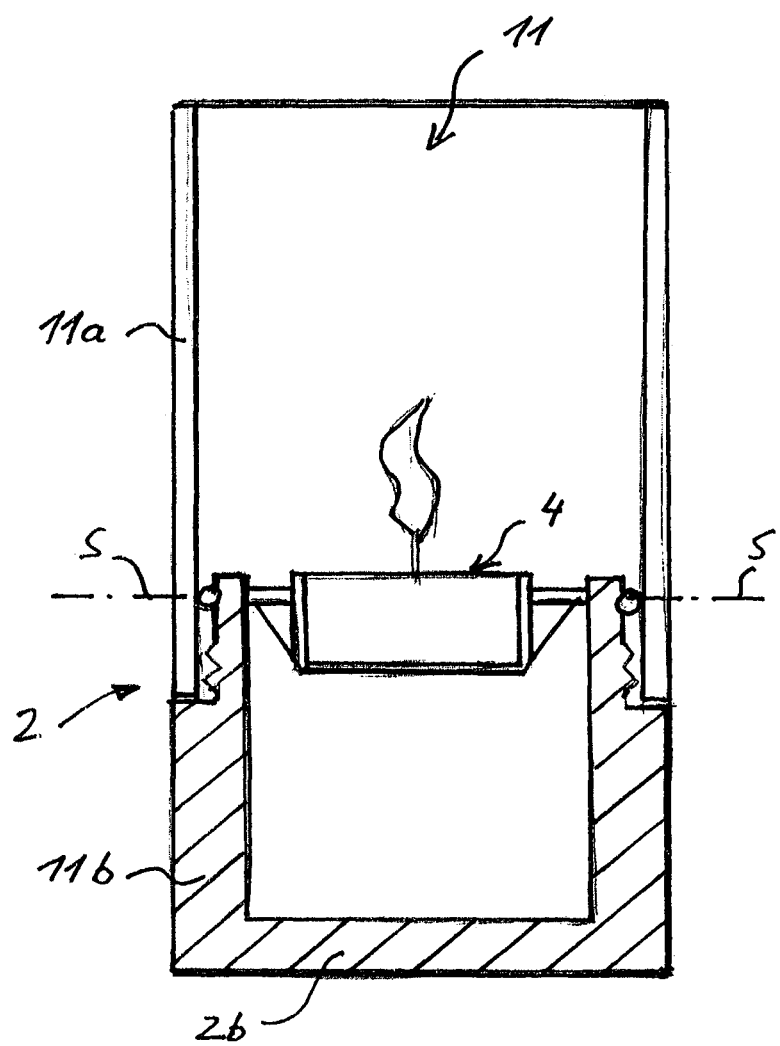
FIG. 6 a modification formed as a table lamp brazier.

This increased lighting effect is often also desired in so-called "tea lights", which are also used as table lamps, so to represent a "small" brazier. In this case, namely the operating position, an upper region 11a is usually formed as a glass tube, as shown in FIG. 6. The lower portion 11b of the tea light 11 (as a small version of the brazier 1) is usually made of heavy metal or solid ceramic for reasons of stability, wherein both elements 11a, b are connected to form the above-described basket 2 via a plug connection or a thread. At the dividing plane, a small fire pan 4 is also provided, which is mounted cradle-like on pivot bearings S. In this fire pan 4, a wax is used here, which is ignited at a wick to generate a flame, as sketched.

To extinguish the flame, the tea light 11 as a modified brazier 1 is rotated "overhead", namely about the axis of the pivot bearings S, so that the glass tube 11a is then below and the area 11b is above. The fire pan 4 carries out this tilting in unchanged horizontal position, so that the flame then hits the (closed) bottom 2b of the element 11b and—as described above for FIGS. 1 to 5 is then quickly extinguished for lack of air. This principle can also be used for floor lamps (cf. FIG. 5 with increased lighting effect) or wall hanging lamps, with extinguishing the lamp when the housing or basket 2 is rotated overhead, but the fire pan 4 therein remains in a horizontal position. Thus, oil can be used as well, which is filled in the fire pan 4 (e.g. at historic festivals). If pivoting about the axis of bearings S is too vehement with a cylindrically shaped housing, it might be recommendable to fill-up oil only to half the filling level. By the preferred parallel alignment of the pivot bearing S to a side edge of the (cuboid) basket 2, in particular a support strip 2a, tilting movement (cf. arrows X and Y in FIG. 2) can be performed very smoothly, so that larger filling heights are possible without spilling fuel from the fire pan 4.

The invention claimed is:

1. Brazier for burning wood and similar fuels, with a largely pot-shaped basket (2) and a fire pan (4), comprising:
   the fire pan (4) is pivotally mounted at the basket (2) relative to each other, to be tilted, from an operating position to a fire-extinguishing position, wherein the basket (2) is located at the top in the fire-extinguishing position to serve as fire suffocating cover.

2. Brazier according to claim 1, further comprising the basket (2) has a plurality of openings (3).

3. Brazier according to claim 1, further comprising the basket (2) is cube-shaped.

4. Brazier according to claim 1, further comprising the fire pan (4) is conical or cone-shaped.

5. Brazier according to claim 1, further comprising the fire pan (4) has handles (4*a*).

6. Brazier according to claim 5, further comprising pivot bearings (S) of the fire pan (4) are arranged adjacent to the handles (4*a*).

7. Brazier according to claim 6 wherein the pivot bearings (S) of the fire pan are integrally formed at the fire pan (4).

8. Brazier according to claim 1, further comprising the basket (2) is closable with a lid (5), which forms a seat.

9. Brazier according to claim 1, further comprising the basket (2) has supporting strips (2*a*), which are.

10. Brazier according to claim 9 wherein the supporting strips are integrally formed.

11. Brazier according to claim 1, further comprising a circumferential gap is provided between the inside of the basket (2) and the outer periphery of the fire pan (4) for supplying combustion air from the partially open bottom of the basket (2).

12. Brazier according to claim 1, further comprising a grill pad (6) can be placed on the basket (2).

13. Brazier according claim 1, further comprising the grill pad (6) can be inserted in different ones of the openings (3) for height adjustment.

14. Brazier according to claim 9, further comprising a plurality of braziers (1).

15. Brazier according to claim 14 wherein the plurality of braziers (1) are stackable as a column, one above the other, positively engaged by support strips.

16. Brazier according to claim 1, further comprising the brazier (1) is shaped as a tea light (11), a floor lamp or a hanging lamp.

17. Brazier according to claim 16, further comprising the fire pan (4) is filled with oil or wax.

18. Brazier according to claim 17 wherein the oil or wax has a wick in the center for lighting the fire.

19. Brazier according to claim 1, further comprising the basket (2) consists of metal or ceramic.

20. Brazier according to claim 19 comprising the basket with an integrally formed, at least substantially closed bottom.

* * * * *